(12) United States Patent
Yamaguchi

(10) Patent No.: US 6,512,315 B1
(45) Date of Patent: Jan. 28, 2003

(54) BRUSHLESS MOTOR HAVING TURNTABLE

(75) Inventor: Tadao Yamaguchi, Isesaki (JP)

(73) Assignee: Tokyo Parts Industrial Co., Ltd., Gunma-ken (JP)

( * ) Notice: Subject to any disclaimer, the term of this patent is extended or adjusted under 35 U.S.C. 154(b) by 1 day.

(21) Appl. No.: 09/900,014

(22) Filed: Jul. 9, 2001

(51) Int. Cl.$^7$ .............................. H02K 5/24; H02K 7/00
(52) U.S. Cl. ................ 310/51; 310/67 R; 310/40 MM; 360/93.08; 360/99.03; 360/99.05; 360/99.12
(58) Field of Search ................................ 310/51, 67 R, 310/40 MM; 360/98.08, 99.03, 99.05, 99.12, 99.04, 99.02; 369/270, 271

(56) References Cited

U.S. PATENT DOCUMENTS

| | | | | |
|---|---|---|---|---|
| 5,304,879 A | * | 4/1994 | Suzuki et al. ............. | 310/67 R |
| 5,396,135 A | * | 3/1995 | Iwazaki et al. ............. | 310/90 |
| 5,442,247 A | * | 8/1995 | Suzuki et al. ............. | 310/67 R |
| 5,796,193 A | * | 8/1998 | Sakano et al. ............. | 310/67 R |
| 5,923,110 A | * | 7/1999 | Zhao et al. ............. | 310/91 |
| 5,956,205 A | * | 9/1999 | Konno et al. ............. | 360/99.02 |
| 6,242,826 B1 | * | 6/2001 | Saito et al. ............. | 310/51 |
| 6,249,506 B1 | * | 6/2001 | Oowaki et al. ............. | 360/99.05 |
| 6,252,319 B1 | * | 6/2001 | Sudo et al. ............. | 310/67 R |
| 6,281,608 B1 | * | 8/2001 | Matsushima ............. | 310/51 |

FOREIGN PATENT DOCUMENTS

JP     2000-90527     3/2000

\* cited by examiner

*Primary Examiner*—Tran Nguyen
*Assistant Examiner*—Thanh Lam
(74) *Attorney, Agent, or Firm*—Leydig, Voit & Mayer, Ltd.

(57) ABSTRACT

A brushless motor having a turntable including a rotor in which a turntable is integrally formed on the outer side of a rotor case and a magnet is arranged on the inner side thereof, a shaft for supporting the rotor, a stator base for supporting the shaft, and a stator formed on a portion of the stator base for driving the rotor, in which the turntable which has a media mounting portion at least partly formed of resin, includes a media installation guide formed of the same resin to support a medium, and at least one media inner diameter chucking spring member integrally formed of resin to have a diameter slightly greater than the media installation guide and the inner diameter of the media.

10 Claims, 2 Drawing Sheets

BRUSHLESS MOTOR HAVING TURNTABLE

BACKGROUND OF THE INVENTION

1. Field of the Invention

The present invention relates to a brushless motor having a less turntable for driving media such as CD-ROMs or DVD-ROMs.

2. Description of the Related Art

Referring to FIG. 2, a conventional brushless motor for driving media such as CDs includes a rotor R where a turntable T, which is cut from brass, for accommodating a medium is integrally formed at one side of a rotor case K and a magnet M is formed at the other side of the case K, a shaft J for supporting the rotor R, a housing H for rotatably supporting the shaft J, and a stator ST arranged at one side of the housing H for driving the rotor R.

However, since the turntable T for mounting a medium is formed by a brass cutting process, the cost of materials increases and installation thereof is inconvenient. In particular, since verticality of the shaft J is strictly required to drive a medium such as a CD-ROM, the turntable T for mounting the medium is installed on the shaft J and then the turntable T is cut at right angles with respect to the shaft J. However, although brass is relatively easy to cut, while the shaft J is cut, strength is necessarily brought to the shaft J because brass is metal. Accordingly, when strength applied to firmly hold the turntable T is weak, the shaft J is damaged.

Also, to reduce the cost for production, as shown in FIG. 3, a turntable JT formed of resin is used. However, when the turntable JT is used, accurate mounting is required and a thin leaf spring B pressing the inner circumferential portion of a medium is additionally needed to secure support strength with respect to the media.

SUMMARY OF THE INVENTION

To solve the above problems, it is an objective of the present invention to provide a brushless motor having a turntable so that a high-priced turntable formed by cutting brass is not needed and the cost for production can be reduced.

It is another objective of the present invention to provide a brushless motor having a turntable which does not use an additional thin leaf spring to press the inner diameter portion of a medium.

It is yet another objective of the present invention to provide a brushless motor for automatically compensating unbalance of a rotation system with a simple structure.

Accordingly, to achieve the above objectives, there is provided a brushless motor having a turntable including a rotor in which a turntable is integrally formed on the outer side of a rotor case and a magnet is arranged on the inner side thereof, a shaft for supporting the rotor, a stator base for supporting the shaft, and a stator formed on a portion of the stator base for driving the rotor, in which the turntable which has a media mounting portion at least partly formed of resin, includes a media installation guide formed of the same resin to support a medium, and at least one media inner diameter chucking spring member integrally formed of resin to have a diameter slightly greater than the media installation guide and the inner diameter of the media.

It is preferred in the present invention that a ball housing containing mobile balls for compensating unbalance is provided at the turntable opposite to a media mounting surface of the media mounting portion.

It is preferred in the present invention that the turntable is installed at a shaft protruding above the rotor case.

It is preferred in the present invention that the media inner diameter chucking spring member is arranged at a space and a free end thereof protrudes above the media mounting portion.

It is preferred in the present invention that a media slip preventing means is provided on a media mounting surface at least at the outer circumference of the turntable.

It is preferred in the present invention that a media mounting surface of the resin media mounting portion which contacts the medium is cut-processed at right angles with respect to the shaft.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF THE INVENTION

Figure 1:
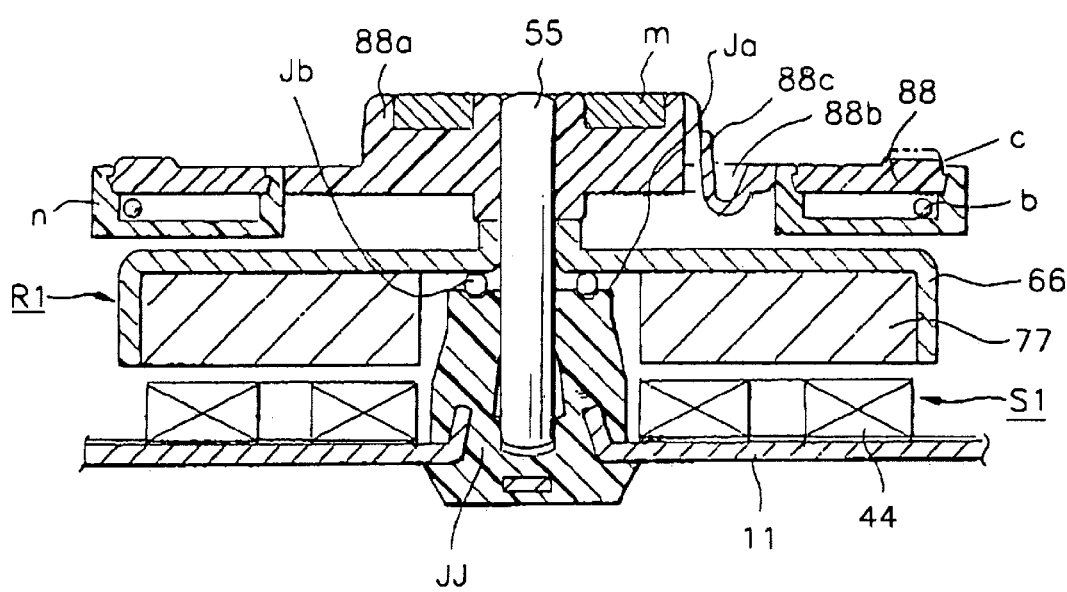
FIG. 1 is a sectional view showing major portions of a radial gap cored type brushless motor having a turntable according to a preferred embodiment of the present invention.
Figure 2:
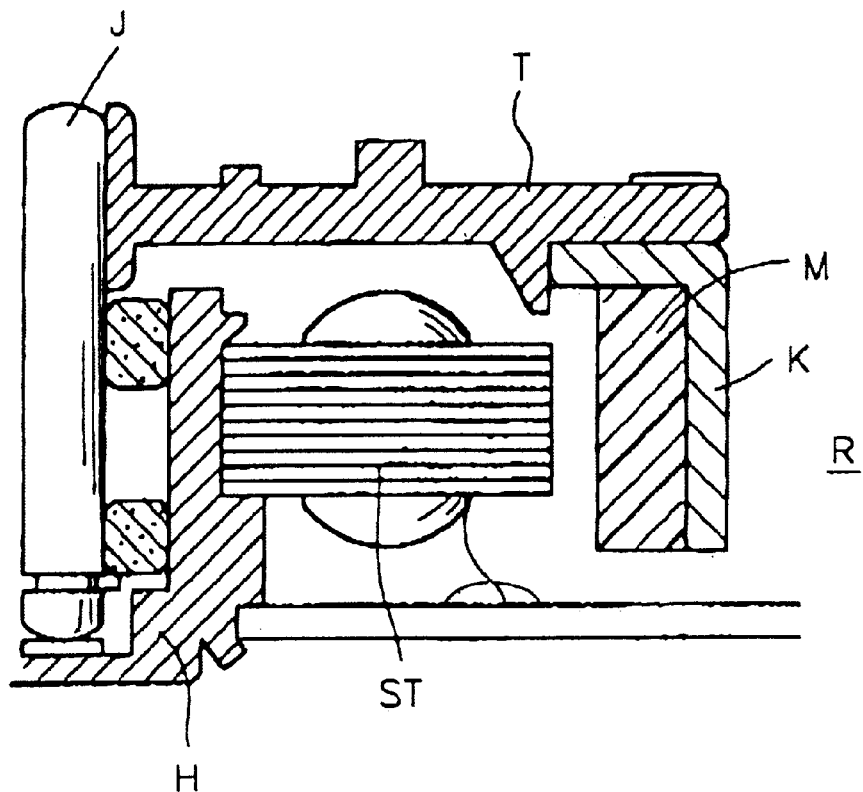
FIG. 2 is a sectional view showing major portions of a conventional brushless motor having a turntable.
Figure 3:
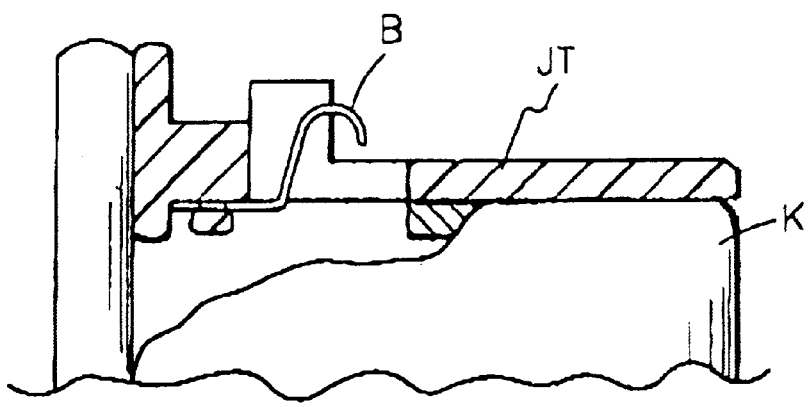
FIG. 3 is a sectional view showing major portions of a conventional brushless motor having a turntable.

FIG. 1 shows a radial gap cored type brushless motor having a turntable according to a preferred embodiment of the present invention. In this embodiment, a media mounting portion 88 formed of resin and functioning as a turntable is installed on a shaft 55 above a rotor case 66. The media mounting portion 88 is separated from the rotor case 66. Thus, a space is formed between the rotor case 66 and the media mounting portion 88. By using the space, a media inner diameter chucking spring portion 88c is integrally formed with a space 88b used as a old insertion hole for molding so that a free end of the media inner diameter chucking spring portion 88c which is formed of the same resin as the media mounting portion 88 sticks upward. In this case, three through five media inner diameter chucking spring portions 88c are circumferentially arranged at a media installation guide 88a. However, only one media inner diameter chucking spring portion may be arranged if chucking can be performed accurately.

In this case, an axial directional gap type motor which can provide a further low profile as a brushless motor is preferred. That is, a rotor R1 is formed by arranging a flat ring type magnet 77 on the ceiling portion of the rotor case 66. A stator S1 is formed by arranging an air-core coil 44 at a stator base 11 so that there is a gap between the stator S1 and the rotor case 66. The rotor R1 is driven by applying electricity to the stator S1. In the drawing, reference letter m denotes a magnet for attracting a medium arranged on the media installation guide 88a. Reference letter n denotes a ball housing as an automatic balance compensation means which is installed by forcible inserting into the resin media mounting portion 88. Reference letter b denotes a mobile ball having a function to compensate for unbalance. Also, a ball bearing Jb is arranged at a top portion Ja of a resin shaft holding portion JJ to reduce a loss of attraction due to a magnetic force of the magnet 77 of the rotor R1 toward the stator base 11.

The surface of a mounting portion C of the media mounting portion 88 indicated by an imaginary line is cut-processed such that the surface of a mounting portion C is at right angles with respect to the shaft 55 and the surface of the mounting portion C is made rough so that appropriate frictional resistance can be obtained. Thus, verticality of the shaft 55 is obtained.

Also, in this embodiment, the media mounting portion 88 is formed by outserting a metal plate with resin and the media mounting portion 88 can be formed of resin.

It is noted that the present invention is not limited to the preferred embodiments described above, and it is apparent that variations and modifications by those skilled in the art can be effected within the spirit and scope of the present invention defined in the appended claims.

As described above, according to the present invention, since an additional media inner diameter chucking spring member is not needed, the production cost and the number of steps of an installation process can be reduced. Since the turntable can be additionally formed, the structure is simplified and the cost can be reduced. Also, when a medium needs to be rotated at a high speed, slippage can be prevented and highly accurate shaft verticality can be obtained. Also, by providing the ball housing, unbalance can be automatically compensated.

What is claimed is:

1. A brushless motor having a turntable comprising:
   a rotor in which a turntable is integrally formed on the outer side of a rotor case and a magnet is arranged on the inner side thereof;
   a shaft for supporting the rotor;
   a stator base for supporting the shaft; and
   a stator formed on a portion of the stator base for driving the rotor,
   wherein the turntable which has a media mounting portion at least partly formed of resin, includes a media installation guide formed of the same resin to support a medium, and at least one media inner diameter chucking spring member integrally formed of resin to have a diameter slightly greater than the outer diameter of the media installation guide and the inner diameter of the media.

2. The motor as claimed in claim 1, wherein a ball housing containing mobile balls for compensating unbalance is provided at the turntable opposite to a media mounting surface of the media mounting portion.

3. The motor as claimed in claim 2, wherein the surface is cut-processed at right angles with respect to the shaft.

4. The motor as claimed in claim 1, wherein the turntable is installed at a shaft protruding above the rotor case.

5. The motor as claimed in claim 4, wherein a media mounting surface of the media mounting portion which contacts the medium is cut-processed at right angles with respect to the shaft.

6. The motor as claimed in claim 1, wherein the media inner diameter chucking spring member is arranged at a space and a free end thereof protrudes above the media mounting portion.

7. The motor as claimed in claim 6, wherein a media mounting surface of the media mounting portion which contacts the medium is cut-processed at right angles with respect to the shaft.

8. The motor as claimed in claim 1, wherein a media slip preventing means is provided on a media mounting surface at least at the outer circumference of the turntable.

9. The motor as claimed in claim 8, wherein the surface of the media mounting portion which contacts the medium is cut-processed at right angles with respect to the shaft.

10. The motor as claimed in claim 1, wherein a media mounting surface of the media mounting portion which contacts the medium is cut-processed at right angles with respect to the shaft.

* * * * *